United States Patent
Ohrstrom et al.

(10) Patent No.: US 11,770,991 B2
(45) Date of Patent: Oct. 3, 2023

(54) VEHICLE CONNECTION GUIDANCE

(71) Applicant: Deere and Company, Moline, IL (US)

(72) Inventors: Nicholas A. Ohrstrom, Bettendorf, IA (US); Nathan R. Vandike, Geneseo, IL (US); Duane M. Bomleny, Geneseo, IL (US); Colin D. Engel, Bettendorf, IA (US); Stephen R. Corban, Kewanee, IL (US)

(73) Assignee: DEERE & COMPANY, Moline, IL (US)

( * ) Notice: Subject to any disclaimer, the term of this patent is extended or adjusted under 35 U.S.C. 154(b) by 847 days.

(21) Appl. No.: 16/670,369

(22) Filed: Oct. 31, 2019

(65) Prior Publication Data

US 2021/0127544 A1 May 6, 2021

(51) Int. Cl.
*A01B 59/00* (2006.01)
*A01B 59/06* (2006.01)
*G07C 5/02* (2006.01)
*B60R 1/00* (2022.01)
*G06T 11/00* (2006.01)
*B62D 15/02* (2006.01)
(Continued)

(52) U.S. Cl.
CPC .......... *A01B 59/061* (2013.01); *A01B 59/066* (2013.01); *B60R 1/00* (2013.01); *B62D 15/0295* (2013.01); *G06T 11/00* (2013.01); *G07C 5/02* (2013.01); *G07C 5/0825* (2013.01); *B60R 2300/308* (2013.01); *B60R 2300/8086* (2013.01); *H04N 7/18* (2013.01)

(58) Field of Classification Search
CPC ... A01B 59/061; A01B 59/066; A01B 59/062; A01B 59/067; A01B 71/063; B60R 1/00; B60R 2300/308; B60R 2300/8086; B62D 15/0295; G06T 11/00; G06T 11/60; G06T 19/006; G07C 5/02; G07C 5/0825; H04N 7/18; H04N 7/183; A01D 34/006; A01D 41/12; A01D 41/127; A01D 41/141
See application file for complete search history.

(56) References Cited

U.S. PATENT DOCUMENTS

| 5,404,095 A | 4/1995 | Lammers |
| 7,204,504 B2 * | 4/2007 | Gehring .................. B60D 1/36 280/477 |

(Continued)

FOREIGN PATENT DOCUMENTS

| EP | 1862050 | 12/2007 |
| EP | 1862050 A2 * | 12/2007 ........... A01B 69/001 |

(Continued)

*Primary Examiner* — Peter D Nolan
*Assistant Examiner* — Peter Y Ning
(74) *Attorney, Agent, or Firm* — Taft Stettinius & Hollister LLP; Stephen F. Rost

(57) ABSTRACT

A vehicle connection guidance system may include a sensor and a controller. The sensor is configured to be supported by a vehicle having a first width and a connection interface, the connection interface having a second width different than the first width and along which multiple connection points lie, wherein the sensor is to output steering angle signals. The Controller is configured to output presentation signals based upon the steering angle signals The presentation signals are to generate a visual presentation of a projected path of the width of the connection interface to an operator of the vehicle.

20 Claims, 5 Drawing Sheets

(51) Int. Cl.
    *G07C 5/08*     (2006.01)
    *H04N 7/18*     (2006.01)

(56) References Cited

U.S. PATENT DOCUMENTS

| | | | |
|---|---|---|---|
| 9,950,739 B2* | 4/2018 | Watanabe | B62D 15/0295 |
| 10,046,613 B2 | 8/2018 | Shepard | |
| 10,617,054 B2 | 4/2020 | Gresch et al. | |
| 10,795,372 B2 | 10/2020 | Runde et al. | |
| 10,875,167 B2 | 12/2020 | Bookwala | |
| 11,427,255 B2* | 8/2022 | Ziebart | B60D 1/62 |
| 2002/0125018 A1* | 9/2002 | Bernhardt | B60D 1/36 |
| | | | 172/439 |
| 2008/0116657 A1 | 5/2008 | Coers et al. | |
| 2008/0231701 A1* | 9/2008 | Greenwood | G06T 7/0008 |
| | | | 348/148 |
| 2011/0102196 A1* | 5/2011 | Kadowaki | B62D 15/0275 |
| | | | 340/932.2 |
| 2013/0226390 A1* | 8/2013 | Luo | B60D 1/36 |
| | | | 348/148 |
| 2014/0012465 A1* | 1/2014 | Shank | B60D 1/58 |
| | | | 701/36 |
| 2014/0064897 A1 | 3/2014 | Montgomery | |
| 2014/0085472 A1* | 3/2014 | Lu | B60R 1/00 |
| | | | 348/148 |
| 2014/0267688 A1* | 9/2014 | Aich | B60W 30/00 |
| | | | 348/113 |
| 2016/0023601 A1* | 1/2016 | Windeler | B62D 15/0275 |
| | | | 348/118 |
| 2016/0236526 A1* | 8/2016 | Shepard | B60D 1/36 |
| 2016/0302357 A1* | 10/2016 | Tippery | A01D 41/127 |
| 2017/0050567 A1* | 2/2017 | Bochenek | G06F 3/04842 |
| 2017/0115730 A1* | 4/2017 | Knebel | G02B 27/0172 |
| 2017/0188505 A1* | 7/2017 | Potier | G05D 1/0221 |
| 2018/0061102 A1* | 3/2018 | Goto | B60D 1/36 |
| 2018/0081370 A1* | 3/2018 | Miller | G05D 1/0246 |
| 2019/0096261 A1* | 3/2019 | Hayashi | B62D 15/029 |
| 2019/0283803 A1* | 9/2019 | Auner | H04N 7/183 |
| 2019/0335100 A1* | 10/2019 | Chen | G06F 16/5854 |
| 2020/0001790 A1* | 1/2020 | Ling | B62D 15/0275 |
| 2020/0079165 A1* | 3/2020 | Niewiadomski | B62D 15/0285 |
| 2020/0114968 A1* | 4/2020 | Xu | B60D 1/36 |

FOREIGN PATENT DOCUMENTS

| | | |
|---|---|---|
| EP | 1862050 A2 | 12/2007 |
| EP | 2682329 | 8/2014 |

\* cited by examiner

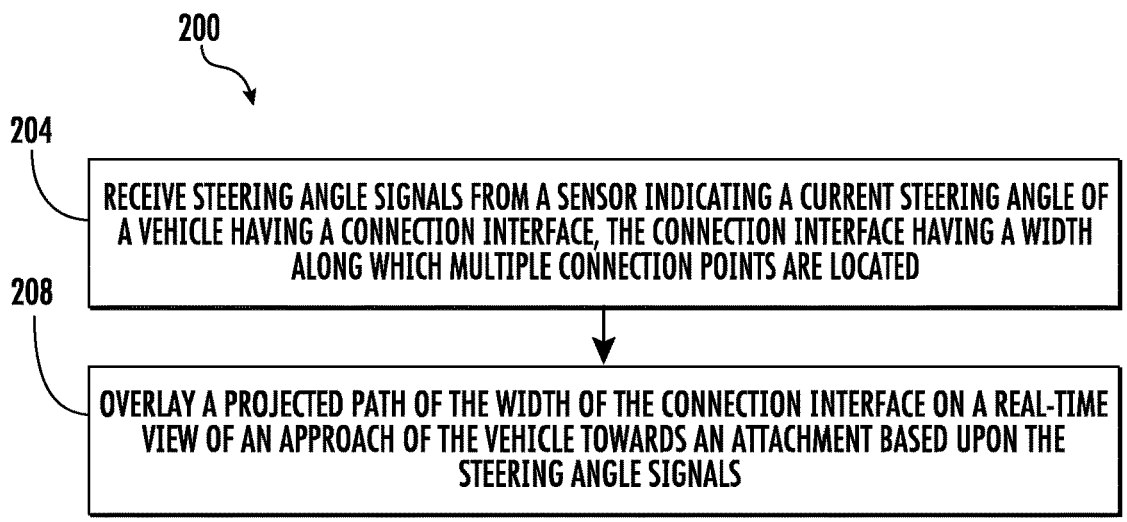
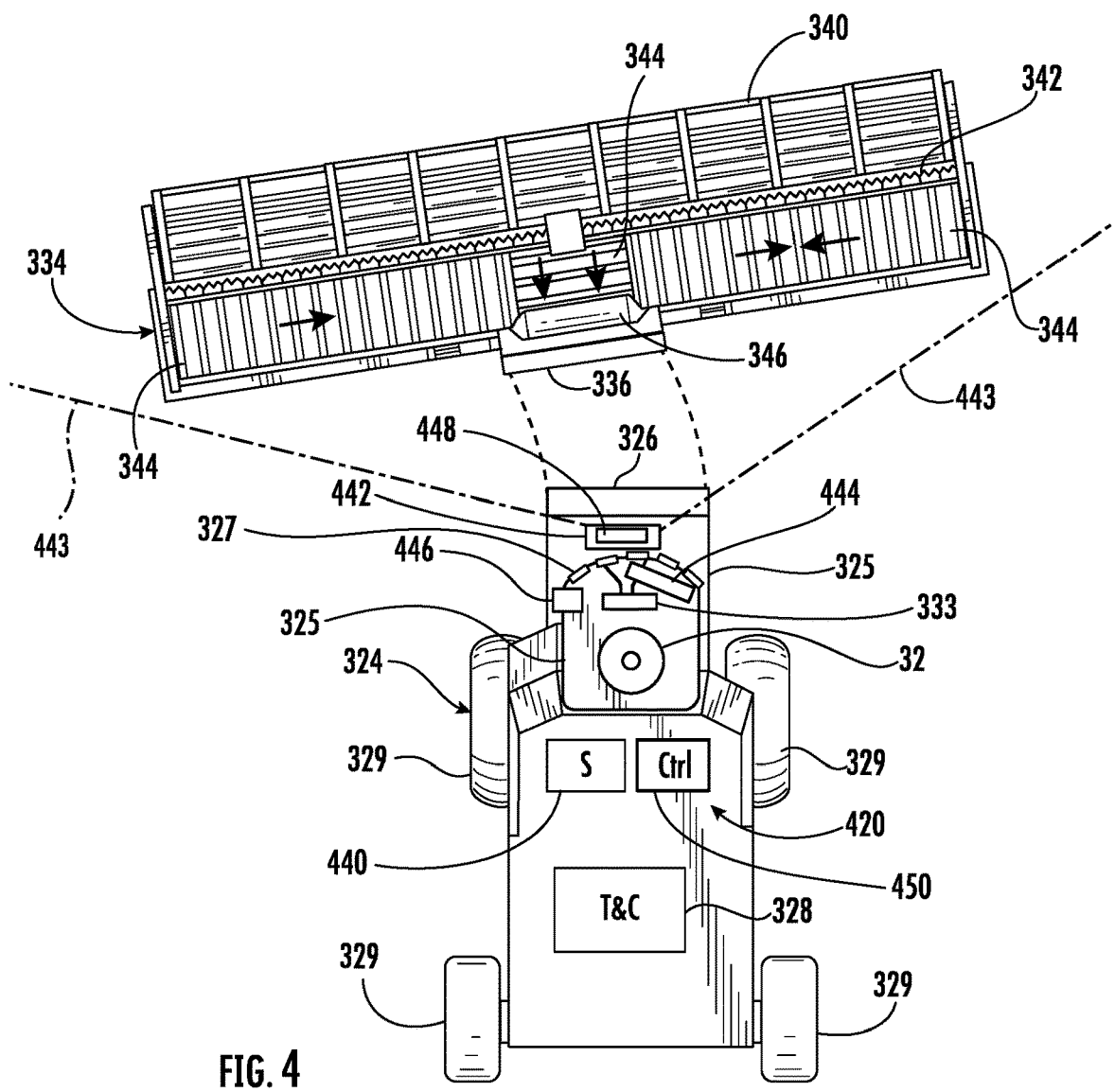

VEHICLE CONNECTION GUIDANCE

BACKGROUND

Attachments are frequently connected to vehicles. Some attachments are cantilevered from the front or rear of vehicle so as to be carried by the vehicle. Other attachments include wheels or other ground engaging members, wherein the vehicle pushes or pulls the attachment. Rather than a single connection point, such as a hitch pin or ball hitch, which may allow the attachment to freely pivot relative to the vehicle, some attachments have multiple connection points extending across a wide width, facilitating enhanced control of the angle of the attachment relative to the vehicle.

BRIEF DESCRIPTION OF THE DRAWINGS

FIG. 3 is a flow diagram of an example vehicle connection guidance method.

FIG. 4 is a top view schematically illustrating portions of an example vehicle connection guidance system for connecting an example harvester to an example header.

Figure 1:
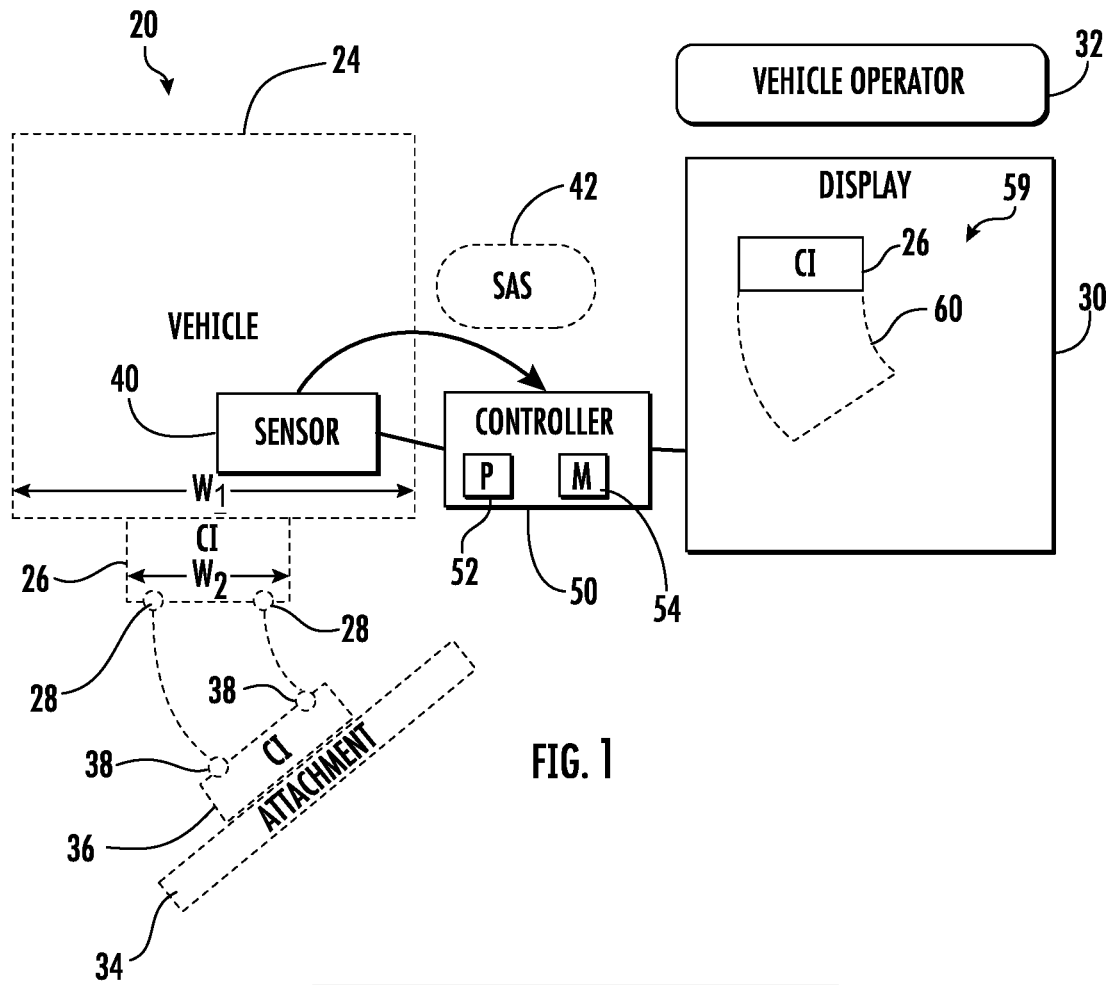
FIG. 1 is a block diagram schematically illustrating portions of an example vehicle connection guidance system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Although attachments that include multiple connection points facilitate enhanced control over the angle of the attachment relative to the vehicle, connecting such attachments to the vehicle may be difficult. Connecting to an attachment having a single connection point, such as a hitch pin or ball hitch, merely demands alignment with the single connection point at any angle. In contrast, connecting a vehicle to an attachment with multiple connection points across a wide width may demand that connection interface of the vehicle and the attachment be parallel to one another upon connection. Achieving such a parallel relationship between the connection interfaces of the vehicle and the attachment is often a challenge for an operator steering the vehicle.

Disclosed are example vehicle connection guidance systems and methods that assist the operator in connecting a vehicle to an attachment across multiple connection points. Disclosed are example vehicle connection guidance systems and methods that assist the operator in achieving a parallel relationship between the vehicle and the attachment when being connected to one another. The example vehicle connection guidance systems and methods are especially well suited to assist in the connection of a feeder house of a harvester to a header.

Disclosed is an example vehicle connection guidance system that may include a sensor and a controller. The sensor is configured to be supported by a vehicle having a first width and a connection interface, the connection interface having a second width different than the first width and along which multiple connection points lie, wherein the sensor is to output steering angle signals. The controller is configured to output presentation signals based upon the steering angle signals. The presentation signals are to generate a visual presentation of a projected path of the width of the connection interface to an operator of the vehicle.

Disclosed is an example vehicle connection guidance method. The method may include receiving steering angle signals from a sensor indicating a current steering angle of a vehicle having a connection interface, wherein the connection interface has a width along which multiple connection points are located. The method may further include overlaying a projected path of the width of the connection interface on a real-world view of an approach of the vehicle towards an attachment based upon the steering angle signals.

For purposes of this disclosure, a "real-world view" refers to any view of the real-world. A "real-world view" may be a direct view of the real-world as seen by a person's eyes without any intervening structures or through transparent or translucent structures, such as a windshield or window panel. A "real-world view" may be an indirect view of the real-world as captured by a camera and presented on a display as a real-world image. The real-world image may be in real time, may be presented on a time delayed basis or may be stored and presented. By way of contrast, computer-generated images or structures, such as lines, graphics and animations are not "real-world", but may be overlaid upon a real-world view.

Disclosed is an example harvester. The example harvester may include a feeder house, a header connection interface proximate the feeder house, a camera to capture a real-world image of an approach of the feeder house towards a header, a display to present the real-world image of the approach captured by the camera, a sensor to output steering angle signals indicative of a steering angle of the harvester during the approach and a controller to output control signals causing the display to overlay a width of the header connection interface and a representation of a width of the header on the real-world image of the approach being presented by the display.

FIG. 1 is a block diagram schematically illustrating portions of an example vehicle connection guidance system 20. System 20 guides and assists in operator in connecting a vehicle to an attachment having a connection interface having multiple spaced connection points. System 20 is configured for use with a vehicle 24 having a first width W1 and a connection interface (CI) 26 having a second width W2 different than the first width W1, and along which multiple connection points 28 (schematically illustrated) extend. The multiple connection points 28 may be in the form of distinct individual connection points spaced along width W2, such as spaced hooks, clevises, bars, attachment openings or the like which inhibit unintended or uncontrolled pivoting or rotation of the attachment relative to the vehicle about a generally vertical axis. In other implementations, the multiple connection points 28 may be in the form of spaced surfaces that are provided by and part of a single continuous bar or other structure, wherein the spaced surfaces provide multiple connection points to inhibit unintended or uncontrolled pivoting or rotation of the attachment relative to the vehicle about a generally vertical axis.

In one implementation, vehicle 24 comprises a vehicle that is steerable through different actuation of ground engaging or motive members, such as wheels or tracks. In one implementation, the steering or turning of the vehicle is achieved through the output of control signals from a controller causing the different actuation of pumps, motors or mechanical or hydraulic transmissions which cause different ground engaging members on different sides of the vehicle to travel or be driven at different speeds. Such control signals may be generated in response to operator input, such as a turning of the steering wheel, movement of a joystick or on either input provided by an operator 32. In yet other implementations, the operator input controlling the turning of the vehicle may be directly transmitted by a steering transmission to the ground engaging or motive members, with or without power assist.

As schematically shown by FIG. 1, system 20 is also configured for use with a display 30. For purposes of this disclosure, the phrase "configured to" denotes an actual state of configuration that fundamentally ties the stated function/use to the physical characteristics of the feature proceeding the phrase "configured to". The display 30 may comprise a monitor or other screen device present a visual image. The display 30 may be mounted to and carried by vehicle 24 for viewing by an operator 32 riding vehicle 24. In other implementations, the display 30 may be at a location remote from vehicle 24, wherein the operator 32, also remote from vehicle 24, remotely controls vehicle 24.

System 20 may be incorporated into vehicle 24 or provided as part of a system with vehicle 24 at the time that vehicle 24 is initially implemented and used following manufacture. In other implementations, system 20 may be provided as an add-on or aftermarket addition for use with an existing vehicle 24. In some implementations, display 30 may be provided as part of the system added to the existing vehicle 24. System 20 comprises sensor 40 and controller 50.

Sensor 40 comprises at least one sensor supported by vehicle 24. Sensor 40 is configured to output steering angle signals. In one implementation, sensor 40 comprises a sensor that detects the steering input provided by operator 32 such as rotation of a steering wheel, movement of a joystick or the like. In such an implementation, sensor 40 generates the steering angle signals based upon the detected steering input, wherein the steering angle signals are not only used by system 20 to guide the operator in providing additional steering input, but are also used to control the actuators, hydraulic pumps, motors, hydraulic transmissions or mechanical transmissions that maneuver the ground engaging or motive members of the vehicle to achieve turning. In one implementation, sensor 40 may comprise a potentiometer that senses rotation of a steering column in response to turning of a steering wheel.

In yet other implementations, sensor 40 is distinct from a second sensor that detects steering input from operator 32 and that generates control signals for controlling the actuators that maneuver the ground engaging members. In such an implementation, sensor 40 may sense the maneuvering of the ground engaging members that result from the control signals generated by the second sensor. For example, in one implementation, sensor 40 may comprise a potentiometer that senses rotation or movement of a steering linkage or axle of a wheel of vehicle 24.

Controller 50 comprises an electronic device or component that outputs presentation signals to display 30 based upon steering angle signals 42 from sensor 40. Controller 50 comprises a processor 52 and a memory 54. Processor 52 carries out instructions contained in memory 54. Memory 54 stores such instructions and may be in the form of software programmed code. In other implementations, memory 54 may be in the form of an integrated circuit, wherein the instructions are in the form of an architecture of various logic components. The instruction contained in memory 54 directs processor 52 to receive the steering angle signals 42 from sensor 40, to analyze the steering angle signals 42 by evaluating the current angle being dictated for the ground motive members and using the current angle to determine a path of vehicle 24 and connection interface 26. The instructions contained in memory 54 further direct processor 52 to generate presentation signals based upon the determined path.

The presentation signals cause display 30 to generate a visual presentation 59 comprising a projected path 60 of the width W2 of the connection interface 26 to operator 32 given the current steering angle signals indicating the current steering angle of vehicle 24. In one implementation, the projected path presents an outline of the edges of the path, the edges being spaced apart by the width or proportional width of connection interface 26. By providing a visual presentation of a projected path 60 of the width W2 of the connection interface, encompassing both connection points 28 (in contrast to displaying the entire width W1 of vehicle 24), controller 50 provides a visual presentation that may better assist operator 32 in aligning the multiple connection points 28 to the corresponding multiple connection points of the connection interface of the attachment to be connected to the vehicle 24 and achieving a parallel relationship between the two connection interfaces of the vehicle and the attachment.

As shown by FIG. 1, in some implementations, the presentation signals output by controller 50 may further cause the generation of a visual presentation 59 that further comprises at least a portion of the connection interface 26 itself at its current location and orientation. For example, in one implementation, a graphic representing the connection interface 26 may be depicted at the beginning of the path. In some implementations, the visual presentation may include an animation illustrating movement of the connection interface 26 along the path.

In such an implementation, the shape and size of the connection interface 26 may be stored in memory 54 or elsewhere and used by controller 50 to generate the visual presentation of the connection interface 26. In some implementations, the shape and size of the connection interface 26 may be determined by controller 50 from an image of connection interface 26 as captured by a camera carried by vehicle 24. For example, in the case of a connection interface mounted at the front of vehicle 24, a camera may be mounted at the front aimed down at the connection interface 26. In the case of connection interface 26 at a rear of vehicle 24, a camera may be mounted at a rear of vehicle 24 and aimed down at the connection interface 26. The same camera may be used to capture an image of the connection interface such as when the visual presentation 59 includes a depiction of the connection interface 26. In other implementations, the presentation signals may cause display 30 to present just the path 60 of connection interface 26 without connection interface 26, wherein the width of the path corresponds to the width of the connection interface 26.

As shown by FIG. 1, the visual presentation 59 of the projected path 60 has a width corresponding to or otherwise proportional to the width W2 of the connection interface 26. Controller 50 may obtain this width W2 from a prior value stored in memory 54. In another implementation, controller 50 may obtain width W2 by prompting operator 32 or another person to enter the width W2. In another implementation, controller 50, following instruction contained in memory 54, may wirelessly access a server database containing width W2, based upon an internal identifier or based upon an operator input identifier for connection interface 26 or vehicle 24.

In yet other implementations, controller 50 may prompt the operator or another person to capture an image of connection interface 26 using a smart phone or camera having an augmented reality application that determines a measurement based upon the captured image. For example, controller 50 may prompt the operator or another person to use the Iphone™ Measure app, wherein the measurements of the connection interface may be obtained and transmitted to controller 50 for determining the width and center of the path 60 that is displayed or projected. In another implementation, controller 50 may follow instruction contained memory 54 for identifying edges of a captured image of interface 26 to determine the shape and dimensions of the interface 26. In yet other implementations, controller 50 may use optical recognition to identify the particular connection interface 26 and thereafter obtain its measurements from an Internet server database resource. In each of such cases, system 20 may be utilized with any of a variety of multiple different vehicle 24 having different interfaces 26. Given the determined center of connection interface 26, its determined width, and the current angle of the ground engaging motive members (wheels or tracks) from the steering angle single 42, controller 50 may determine and generate the path 60.

In one implementation, the visual presentation of the projected path 60 is overlaid upon a camera captured real-world image of the terrain or surroundings across or through which connection interface 26 will be moved as it travels along the determined future path. The camera captured image serves as a background on display 30 for the projected path 60.

In yet other implementations, the projected path 60 may be presented on display 30 relative to a controller generated graphic representing the attachment and its connection interface. For example, in one implementation, vehicle 24 may comprise a camera that captures an image of the current location and orientation of the attachment, wherein controller 40 then utilizes captured image to generate a graphical image that represents or corresponds to the current location and orientation of the attachment. In some implementations, the controller generated image of the attachment and its computer interface may be generated based upon signals from sensors associated with the attachment and/or its connection interface.

In one implementation, system 20 may be operable in various different modes selectable by the operator or based upon lighting conditions, wherein each mode presents the visual presentation of the projected path 60 in a different manner. In one mode, the visual presentation of the projected path 60 may be presented to the operator 30 and multiple concurrent manners. For example, in one mode of operation, controller 50 may output presentation signals which are to cause a projector carried by vehicle 24 to project the visual presentation of the projected path 60 directly onto the surrounding terrain or environment, wherein the operator 32 may see the projected path 60 directly on the surrounding terrain or environment. In one implementation, the projection of the projected path 60 may be illuminated by a laser or other illumination system carried by vehicle 24 and operated under the control of controller 50.

In yet another mode of operation, controller 50 may output presentation signals which are to cause a projector carried by vehicle 24 to project the visual presentation of the projected path 60 onto a windshield or window of vehicle 24 through which the operator 32 views the surrounding terrain or environment. In some implementations, the operator may select a mode where the projected path 60 is concurrently presented on display 30 and directly projected onto the surrounding terrain or environment through which vehicle 24 is to move during connection to the attachment. In yet other implementations, display 30 may be incorporated as part of the window or windshield, wherein the presentation signals output by controller 50 cause the window or windshield to incorporate display 30 to generate a visual presentation of the projected path 60.

Figure 2:
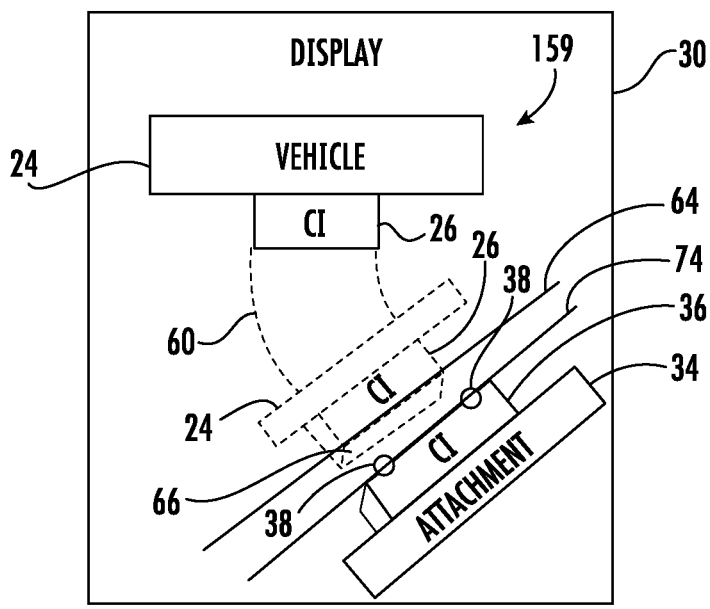
FIG. 2 is a diagram illustrating an example visual presentation presented by the example vehicle connection guidance system of FIG. 1.

In the example illustrated in FIG. 1, the connection interface 26 of vehicle 24 is to be moved, forwardly or rearwardly, into connection with a corresponding connection interface 36 having multiple spaced connection points 38 to facilitate connection to the associated attachment 34. FIG. 2 illustrates another example of a visual presentation 159 that may be presented on display 30, that may be presented on the windshield or that may be projected onto the actual terrain/environment in response to the presentation signals output by controller 50. In the example illustrated, the visual presentation 159 not only includes a visual presentation of the projected path 60 of the connection interface, but additionally includes a depiction of connection interface 26 itself, and at least portions of vehicle 24. In some implementations, visual presentation 159 additionally includes a depiction of the attachment 34 and its connection interface 36 along with connection points 38.

In the example illustrated, the presentation signals output by controller 50 cause the visual presentation 159 to further include a connector line 64 which corresponds to the connecting edge of connection interface 26 and which has a width much greater than the width of connection interface 26. The connector lines 64 may be in the form of a virtual bright line or other visible marking extending beyond the side edges of connection interface 26. Connector line 64 assists the operator in determining the degree to which connection interface 26 and the connection points 28, through which line 64 may extend, is parallel to the connection interface 36 of attachment 34 as connection interface 26 is moved towards attachment 34.

In the example illustrated, to further assist the operator and steering vehicle 24 so as to bring connection interfaces 26 and 36 and aligned in parallel relationship, controller 50 may generate presentation signals which cause presentation 159 to additionally depict a frontward or rearward view of the connection face 66 of connection interface 26 as it is being moved along path 60. The front or rear view of connection interface 26 may be obtained by controller 50 from a stored front or rear image of interface 26, a previously captured front or rear image of interface 26 by an operator that is uploaded to controller 50 or from a web accessed server database containing front or rear images of connection interface 26. In such an implementation, the path 60 being presented generally extends in a two-dimensional substantially horizontal plane, whereas the connection face 66 extends in a generally vertical plane, generally orthogonal to the horizontal plane of path 60.

In the example illustrated, to further assist the operator in steering vehicle 24 so as to bring connection interfaces 26 and 36 into connection, controller 50 may generate presentation signals which cause presentation 159 to further provide visual alignment aids with respect to attachment 34 and its connection interface 36. In the example illustrated, controller 50 outputs present takes signals further causing visual presentation 159 to include attachment connection interface connector line 74. Connector line 74 corresponds to the connecting edge of connection interface 36 and has a width much greater than the width of connection interface 36. The connector line 74 may be in the form of a virtual bright line or other visible marking extending beyond the side edges of connection interface 36. Connector line 74 intersects connection points are 38 and assists the operator in determining the degree to which connection interface 36 and the connection points 38 are parallel to the connection interface 26 of vehicle 24 as connection interface 26 is moved towards attachment 34. In implementation were both lines 64 and 74 provided, the extended length of such lines assists the operator 32 in identifying whether interfaces 26 and 36 are parallel, or what steering changes need to be made to achieve a parallel relationship by visually evaluating the degree to which lines 64 and 74 are parallel.

In one implementation, controller 50 output presentation signals that further cause visual presentation 159 to include a front view of connection interface 36 and/or a portion of attachment 34 and its connection interface 36. The front image of connection interface 36 may be obtained from a camera facing connection interface 36. In one implementation, the front image may include or comprise a bright virtual line corresponding to the boundaries of connection interface 36, overlying the edges are boundaries of connection interface 36 and overlaid upon real-world image of connection interface 36, is captured by a camera maybe presented by visual presentation 159. The bright virtually impose line overlaid upon the actual boundaries are edges of the front view of connection interface 36, extending in a plane generally vertical plane may assist the operator 32 in aligning connection interfaces 26 and 36.

The vehicle 24 with its connection interface 26 and the attachment 34 with its connection interface 38, for which system 20 may be used to assist in guiding the operator during their connection, may comprise a variety of different vehicles and associated attachments. In one implementation vehicle 24 may comprise a harvester or combine while the attachment 34 comprises a header. In another implementation, vehicle 24 may a self-propelled forage harvester all attachment 34 comprises a header. In one implementation, vehicle 24 may comprise a self-propelled windrower while attachment 34 comprises a header or head. In one implementation, vehicle 24 may comprise a loader, skid steer or the like, wherein attachment 34 comprises a bucket, boom, forks, post digger, and the like (skid or ag or construction). In one implementation, vehicle 24 may comprise a backhoe, crawler, compact tractor, crawler track loader, excavator or the like connection to various attachments. In one implementation, vehicle 24 may comprise a tractor, wherein the attachment comprises a three-point hitch for a rear of the tractor or a three-point hitch for a front of the tractor. In one implementation, vehicle 24 may comprise self-propelled applicator, wherein attachment 34 comprises a sprayer boom or a sprayer tank and boom which are releasably connected or mounted to the vehicle 24. In yet another implementation, vehicle 24 may comprise a self-propelled applicator, while attachment 34 comprises a dry spreader box. In still another implementation, vehicle 24 may comprise a compact tractor, wherein attachment 34 comprises a belly mower. In implementations where the attachment comprises a belly motor, the connection interface may be inside the tires, wherein the total vehicle width which would be outside of tires.

FIG. 3 is a flow diagram of an example vehicle connection guidance method 200. Method 200 assists the operator in achieving a parallel relationship between the vehicle and the attachment when being connected to one another across multiple connection points. Although method 200 is described in the context of being carried out by system 20, it should be appreciated that method 200 may likewise be carried out with any of the systems, vehicles and attachments described in the disclosure as well as other similar systems, vehicles and attachments.

As indicated by block 204, a controller, such as controller 50, receives steering angle signals from a sensor, such as sensor 40, indicating a current steering angle of a vehicle comes edges vehicle 24, which has a connection interface, such as connection interface 36. The connection interface may have a width along which multiple connection points are located.

As indicated by block 208, based upon a provided or determined width of the control interface and the steering angles, controller 50 outputs presentation signals causing a projected path of the width of the connection interface to be overlaid on a real-world view of an approach of the vehicle towards an attachment. In one implementation, the projected path is overlaid upon the surrounding environment or terrain itself through which the vehicle is to move when moving towards the attachment. In another implementation, the projected path is overlaid upon a windshield or window through which an operator may be viewing the surrounding terrain or environment through which the vehicle is to move when moving towards the attachment. In another implementation, the projected path is overlaid upon a real-world captured image of the surrounding terrain or environment being presented on a display or monitor.

As described above, the method may comprise additional visual assists for the operator. For example, in addition to the overlaid path of the width of the connection interface, connection line 64 and/or line 74 may be overlaid upon the real-world view. In some implementations, a front or rear view of the front or rear face of connection interface 26 and/or connection interface 36 may be overlaid upon the real-world view.

FIG. 4 is a top view illustrating portions of an example vehicle in the form of a harvester 324, to be attached to an example attachment, in the form of a header 334, wherein the harvester 324 is provided with an example vehicle connection guidance system 420. Harvester 324 comprises a self-propelled piece of agricultural equipment that is configured to gather and sever a crop from its growing medium and to thresh and clean grain of the crop. In the example illustrated, harvester 324 comprises a feeder house 325 having a connection interface 326, a threshing and cleaning system 328 (schematically shown) and a set of ground motive members in the form of wheels 329.

Feeder house 325 projects from a forward end of harvester 324 and supports connection interface 326 in the form of hooks, clevises or the like. Feeder house 325 is configured to be releasably connected to a corresponding connection interface 336 of header 334. Feeder house 325 receives crop material from header 334 and rearwardly conveys such crop material to threshing and cleaning system 328. Threshing and cleaning system 328 may comprise a rotor, a straw walker and/or a set of chafers or sieves for separating straw and chaff from grain, wherein the grain is filtered through the set of chafers or sieves and is temporarily stored in a grain tank.

Wheels 329 support and propel harvester 324 across a field. In one implementation, harvester 324 is a front wheel drive, wherein the front wheels 329 are driven by an internal combustion engine and associated transmission and wherein the rear wheels 329 are turned to steer harvester 324. In other implementations, harvester 329 may be steered in other manners.

In the example illustrated, harvester 324 is configured to be driven by an operator 32 seated within a cab 332 having a forwardly facing windshield 327. Cab 332 may include a steering wheel 333 by which the operator 32 may steer rear wheels 329 to steer harvester 325. In other implementation, harvester 324 may be remotely controlled by a remote operator 32 using wireless transceivers and remote controls. The remote location may include a steering wheel, joystick or steering interface.

Header 334 is releasably mountable to connection interface 326 and feeder house 325. In the example illustrated, header 334 comprises a rotatably driven reel 340 that gathers crops and an underlying cutter bar 342 that severs a crop from the growing medium. The severed and gathered crop material is then conveyed by draper belts 344 to a rotatably driven feeder or drum 346 which further moves the crop material into feeder house 325 for further conveyance to threshing and cleaning system 328. In other implementation, header 334 may have other configurations. For example, in other implementation, header 334 may be in the form of a corn row ahead having a series of row units, stalk rollers, stripper plates and conveying chains that gather ears of corn and convey the ears of corn towards feeder house 325. In still other implementation, header 334 may be configured to gather and sever other types of crops from respective growing mediums. In the example illustrated, header 334 is resting on the ground. Another implementation, header 334 may be resting upon a trailer or may be supported in other fashions.

Vehicle connection guidance system 420 is similar to vehicle connection guidance system 20 described above in that vehicle connection guidance system 420 provides operator 32 with visual assists to facilitate the connection of a vehicle connection interface to an attachment connection interface. In the example illustrated, vehicle connection guidance system 420 provides visual assistance to in operator steering harvester 324 to align connection interface 326 at the front end of feeder house 325 to connection interface 336 at a rear end of header 334. Vehicle connection guidance system 420 comprises sensor 440, camera 442, monitor 444, windshield projector 446 and external projector 448 and controller 450.

Sensor 440 is similar to sensor 40 described above. Sensor 440 comprises at least one sensor supported by harvester 324. Sensor 440 is configured to output steering angle signals. In one implementation, sensor 440 comprises a sensor that detects the steering input provided by operator 32 such as rotation of steering wheel 333 or manipulation of another steering interface or a remote steering interface. In such an implementation, sensor 440 generates the steering angle signals based upon the detected steering input, wherein the steering angle signals are not only used by system 420 to guide the operator in providing additional steering input, but are also used to control the actuators, hydraulic pumps, motors, hydraulic transmissions or mechanical transmissions that maneuver the wheels 329 of the harvester 324 to achieve turning. In one implementation, sensor 440 may comprise a potentiometer that senses rotation of a steering column in response to turning of a steering wheel.

In other implementations, sensor 440 is distinct from a second sensor that detects steering input from operator 32 and that generates control signals for controlling the actuators that maneuver the wheels. In such an implementation, sensor 440 may sense the maneuvering of the wheels that result from the control signals generated by the second sensor. For example, in one implementation, sensor 440 may comprise a potentiometer that senses rotation or movement of a steering linkage or axle of wheels 329.

Camera 442 is carried by harvester 324 and is supported or oriented just to capture a terrain or environment in front of harvester 324 and in front of feeder house 325 as indicated by broken lines 443. Camera 442 captures a video or images of the terrain as well as images of the header 334 which is to be attached to harvester 324 with the assistance of system 420. In some implementations, harvester 324 may include multiple cameras at different angles, wherein the different captured images are merged or are selectable for viewing by operator 32.

Monitor 444 comprises a device for presenting the visual presentation presented by controller 450. Monitor 444 provides a display. In the example illustrated, monitor 444 is mounted within cab 325 for being viewed by the operator 32. In other implementations where the operator 32 remotely controls harvester 324, monitor 444 may also be located remote from harvester 324. In one implementation, monitor 444 additionally serves as an operator input device such as where monitor 444 comprises a touchscreen.

Windshield projector 446 comprises a device configured to project or otherwise cause a visual presentation to be displayed upon windshield 327. The visual presentation provided on windshield may be translucent, permitting the operator to concurrently view the visual presentation and the real-world environment or terrain in front of harvester 324 through the visual presentation. In other implementations, such as where the visual presentation is comprised of relatively thin visible lines, the thin visible lines may be opaque, but wherein the thin visible lines do not substantially impair the operator's ability to comprehend the real-world environment or terrain in front of harvester 324 as seen through windshield 442.

External projector 448 comprises a device that projects a visual presentation onto the terrain/ground in front of harvester 324 and/or onto rearwardly facing surfaces of header 334 as harvester 324 is approaching header 334. In one implementation, external projector 448 may comprise a laser or a group of lasers that project visible beams of light onto the terrain/ground in front of harvester 324.

Controller 450 is similar to controller 50 described above. Controller 450 comprises an electronic device or component that outputs presentation signals based upon steering angle signals from sensor 440. Controller 50 comprises a processor 52 and a memory 54 (shown and described with respect to FIG. 1). The instructions contained in memory 54 direct processor 52 to receive the steering angle signals from sensor 40, to analyze the steering angle signals by evaluating the current angle being dictated for the steering wheel 329 and using the current angle to determine a path of parser 324 and connection interface 326. The instructions contained in memory 54 further direct processor 52 to generate presentation signals based upon the determined path.

In the example illustrated, the instructions contained in memory 54 direct processor 52 to prompt or permit operator 32 to select from one of various modes for the display of the visual presentation generated by controller 50. In a first operator selected mode, controller 50 outputs control signals causing the generated visual presentation to be presented on monitor 444. In such an implementation, monitor 444 may present a live stream or images of the real-world terrain or environment in front of harvester 324 as captured by camera 442, wherein the visual presentation with the connection assists is overlaid upon the live stream or images of the real-world terrain or environment in front of harvester 324.

In a second operator selected mode, controller 50 outputs control signals causing windshield projector 446 to present the visual presentation generated by controller 50. In such an implementation, the real-world terrain or environment is seen through the windshield 327 while the visual presentation including the visual connection assists are present on windshield 327, effectively being overlaid on the real-world terrain or environment.

In a third operator selected mode, controller 50 outputs control signals causing external projector 448 to project the visual presentation with the connection assists generated by controller 50 directly upon the ground or terrain in front of harvester 324, wherein the visual presentation is overlaid upon the real-world environment in front of harvester 324 as seen through windshield 327. In one implementation, controller 50 permits operator 32 to select multiple concurrent modes of operation such that the visual presentation with connection assists is concurrently presented by two or more of monitor 444, windshield projector 446 and external projector 448.

Figure 5:
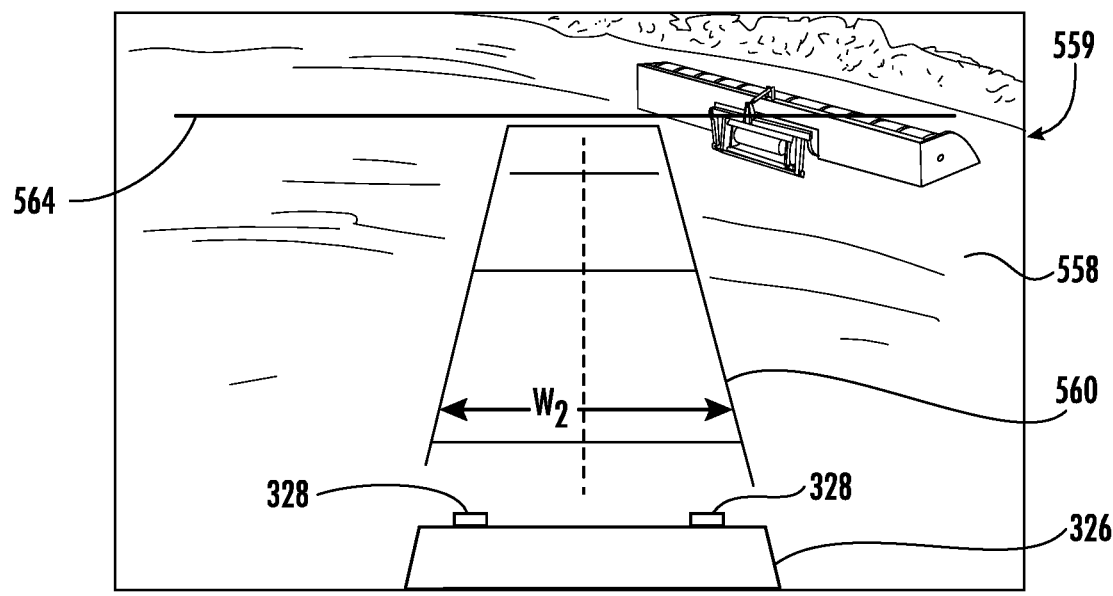
FIG. 5 is a diagram illustrating an example visual presentation presented by the example vehicle guidance system of FIG. 4.
Figure 6:
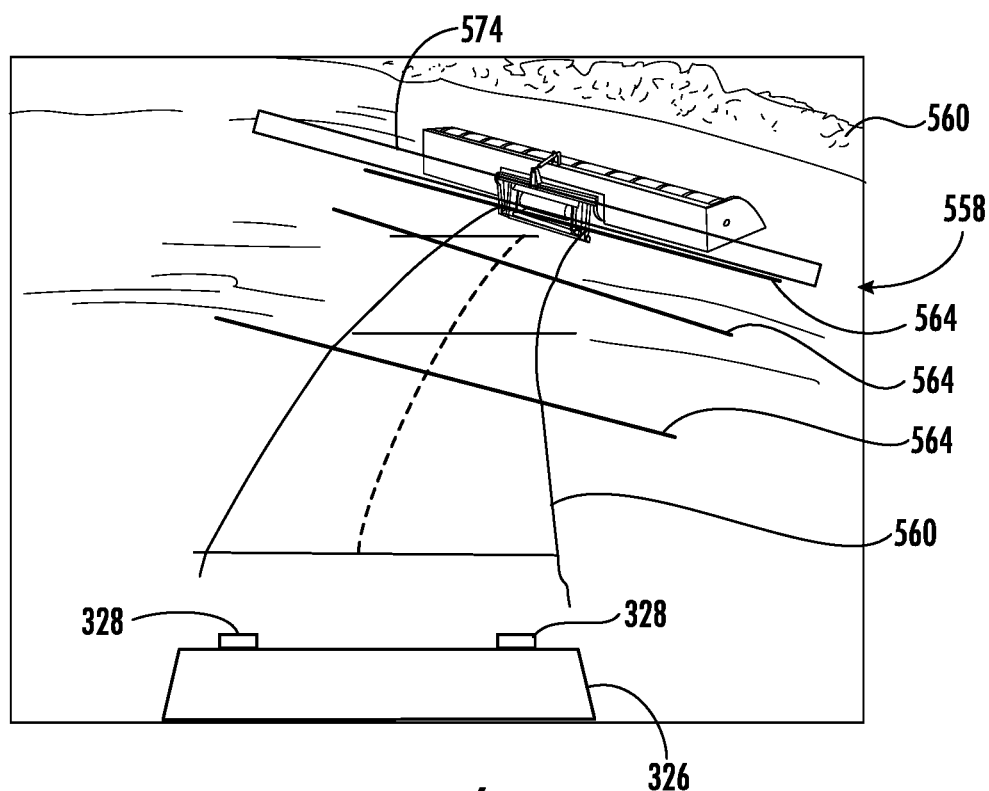
FIG. 6 is a diagram illustrating an example visual presentation presented by the example vehicle guidance system of FIG. 4.

FIGS. 5 and 6 illustrate an example of views of a visual presentation 559 that may be generated by controller 50 based upon steering angle signals received from sensor 340. As shown by FIGS. 5 and 6, the real-world view 558 serves as a background for the connection assists being presented. The real-world view 558 may be an image of the real-world captured by camera 442 and presented on monitor 444 or may be the real-world itself as seen directly through windshield 327, depending upon the user selected mode.

As further show by FIGS. 5 and 6, the visual presentation 559 includes multiple connection assists that are overlaid or projected onto the real-world view 558. In the example illustrated, visual presentation 559 includes a projected path 560 of the width W2 of the connection interface 326 given the current steering angle signals indicating the current steering angle of harvester 324. In one implementation, the projected path presents an outline of the edges of the path, the edges being spaced apart by the width or proportional width of connection interface 326. By providing a visual presentation of a projected path 560 of the width W2 of the connection interface, encompassing both connection points 328 (in contrast to displaying the entire width of harvester 324), controller 450 provides a visual presentation that may better assist operator 32 in aligning the multiple connection points 428 to the corresponding multiple connection points of the connection interface of the header 334 to be connected to the parser 324 and achieving a parallel relationship between the two connection interfaces of the vehicle and the attachment.

As further show by FIGS. 5 and 6, the presentation signals output by controller 450 may further cause the visual presentation 559 to further comprise at least a portion of the connection interface 326 itself at its current location and orientation. For example, in one implementation, the connection interface 326, in the form of a graphic representing the connection interface, may be depicted at the beginning of the path. In some implementations, the visual presentation may include an animation illustrating movement of the connection interface 326 along the path.

As described above, the shape and size of the connection interface 326 may be stored in memory 54 or elsewhere and used by controller 450 to generate the visual presentation of the connection interface 326. In some implementations, the shape and size of the connection interface 326 may be determined by controller 450 from an image of connection interface 326 as captured by camera 442. For example, camera 442 may be mounted at the front aimed down at the connection interface 326.

As shown by FIGS. 5 and 6, the visual presentation 559 of the projected path 560 has a width corresponding to or otherwise proportional to the width W2 of the connection interface 326. Controller 450 may obtain this width W2 from a prior value stored in memory 54. In another implementation, controller 450 may obtain width W2 by prompting operator 32 or another person to enter the width W2. In another implementation, controller 450, following instruction contained in memory 54, may wirelessly access a server database containing width W2, based upon an internal identifier are based upon an operator input identifier for connection interface 26 or vehicle 24.

In yet other implementations, controller 450 may prompt the operator or another person to capture an image of connection interface 326 using a smart phone or camera having an augmented reality application that determines a measurement based upon the captured image. For example, controller 450 may prompt the operator or another person to use the Iphone™ Measure app, wherein the measurements of the connection interface may be obtained and transmitted to controller 450 for determining the width and center of the path 560 that is displayed or projected. In another implementation, controller 50 may follow instruction contained memory 54 for identifying edges of a captured image of interface 326 to determine the shape and dimensions of the interface 326. In yet other implementations, controller 450 may use optical recognition to identify the particular connection interface 26 and thereafter obtain its measurements from an Internet server database resource.

In yet other implementations, the projected path 60 may be presented on display 30 relative to a controller generated graphic representing the attachment and its connection interface. For example, in one implementation, camera 422 may capture an image of the current location and orientation of the attachment, wherein controller 40 then utilizes captured image to generate a graphical image that represents or corresponds to the current location and orientation of the attachment. In some implementations, the controller generated image of the attachment and its computer interface may be generated based upon signals from sensors associated with the attachment and/or its connection interface.

In the example illustrated, the presentation signals output by controller 450 cause the visual presentation 559 to further include connection assists in the form of a series of connector lines 564 which corresponds to the connecting edge of connection interface 26 at different points in time during movement along the current path or trajectory, wherein each of the connector lines 564 has a width much greater than the width of connection interface 326. The connector lines 564 may be in the form of a virtual bright line or other visible marking extending beyond the side edges of connection interface 326. Connector lines 64 assist the operator in determining the degree to which connection interface 326 is parallel to the connection interface 336 of header 334 as connection interface 326 is moved towards header 334.

As shown by FIG. 6, to further assist the operator in steering harvester 324 (shown in FIG. 4) so as to bring connection interfaces 326 and 336 into an aligned and parallel relationship, controller 450 may generate presentation signals which cause presentation 559 to further provide visual alignment aids with respect to header 334 and its connection interface 336. In the example illustrated, controller 450 outputs presentation that further cause visual presentation 559 to include attachment connection interface connector line 574. Connector line 574 corresponds to the connecting edge of connection interface 336 and has a width much greater than the width of connection interface 336. The connector line 574 may be in the form of a virtual bright line or other visible marking extending beyond the side edges of connection interface 336. Connector line 574 intersects connection points of interface 336 and assists the operator in determining the degree to which connection interface 336 and the connection points are parallel to the connection interface 326 of harvester 324 as connection interface 326 is moved towards header 334. In implementation were both lines 564 and 574 provided, the extended length of such lines assists the operator 32 in identifying whether interfaces 326 and 336 are parallel, or what steering changes need to be made to achieve a parallel relationship by visually evaluating the degree to which lines 564 and 574 are parallel.

Figure 7:
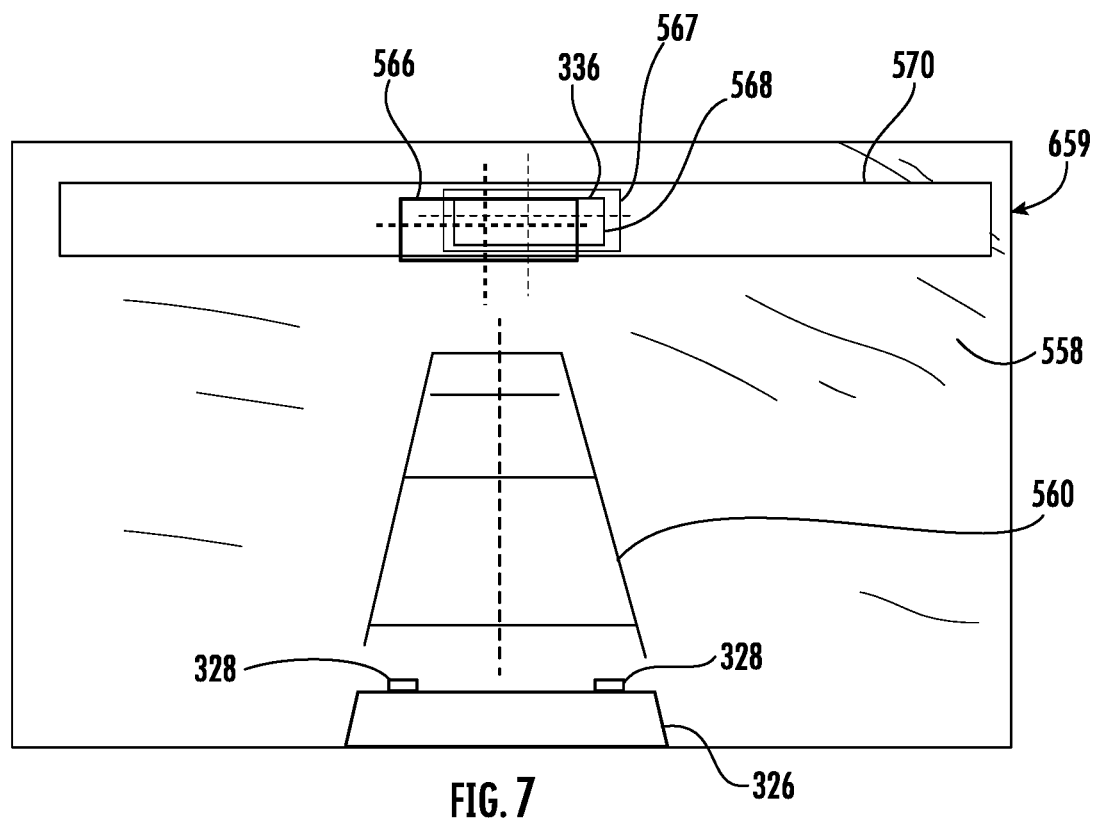
FIG. 7 is a diagram illustrating an example visual presentation presented by the example vehicle guidance system of FIG. 4.
Figure 8:
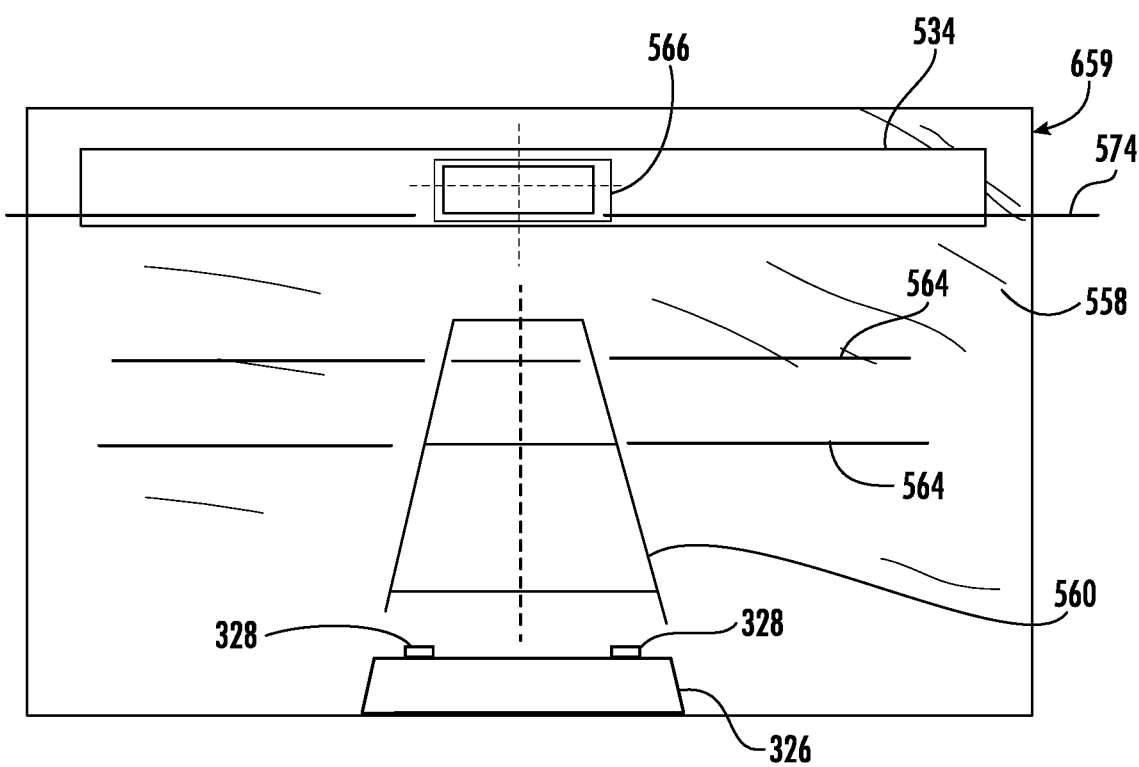
FIG. 8 is a diagram illustrating an example visual presentation presented by the example vehicle guidance system FIG. 4.

FIGS. 7 and 8 illustrate an example of views of a visual presentation 659 that may be generated by controller 450 based upon steering angle signals received from sensor 440. Visual presentation 659 is similar to visual presentation 559 described above except that visual presentation 659 includes additional visual aids for assisting the operator in aligning connection interfaces 326 and 336. As shown by FIGS. 7 and 8, controller 450 outputs control signals to depict or represent a frontward or rearward view of the connection face 566 of connection interface 326 as it is being moved along path 560. The front or rear view of connection interface 326 may be obtained by controller 450 from a stored front or rear image of interface 326, a previously captured front or rear image of interface 326 by an operator that is uploaded to controller 450 or from a web accessed server database containing front or rear images of connection interface 326. The positioning and orientation of the depicted connection face 566 is determined by controller 450 based upon steering angle signals received from sensor 440. In such an implementation, the path 560 being presented generally extends in a two-dimensional substantially horizontal plane, whereas the connection face 566 extends in a generally vertical plane, generally orthogonal to the horizontal plane of path 560.

In the example illustrated, controller 550 further generates control signals causing the visual presentation being generated to include a target positioning outline 567, wherein outline 567 is an outline of connection interface 326 when aligned with respect to connection interface 336. The outline 567 is overlaid on either a real-world rear view of the rear face of header 334 or graphical representation or highlighting of header 334. As a result, the operator may more easily achieve precise connection of interfaces 326 and 336 by steering harvester 324 to align the depicted connection face outline 566 with the target positioning outline 567.

In one implementation, controller 450 outputs presentation signals that further cause visual presentation 659 to include a front view of connection interface 336 and/or a portion of header 334 and its connection interface 336. The front image of connection face 568 may be obtained from camera 442 facing connection interface 336. In the example illustrated, the connection face 568 may include or comprise a bright virtual line corresponding to the boundaries of connection interface 336, overlying the edges or boundaries of connection interface 336 and overlaid upon real-world view, such as a real-world image of connection interface 336, as captured by camera 442. The bright virtually imposed highlight line is overlaid upon the actual boundaries or edges of the front view of connection interface 336, extending in a plane generally vertical plane may assist the operator 32 in aligning connection faces 566 and 568 (shown aligning 8) to assist in the connection of interfaces 326 and 336.

In the example illustrated, controller 550 further applies edge boundary detection image analysis to identify the edges of the rear face of header 334, wherein the rear face of header 334 is either graphically represented or optically highlighted as represented by the rear depiction 570 of header 334. The graphical representation or optical highlighting of the rear face of header 334, from which connection interface 336 extends may further assist in ensuring parallelism with respect to connection interfaces 326 and 336.

Figure 9:
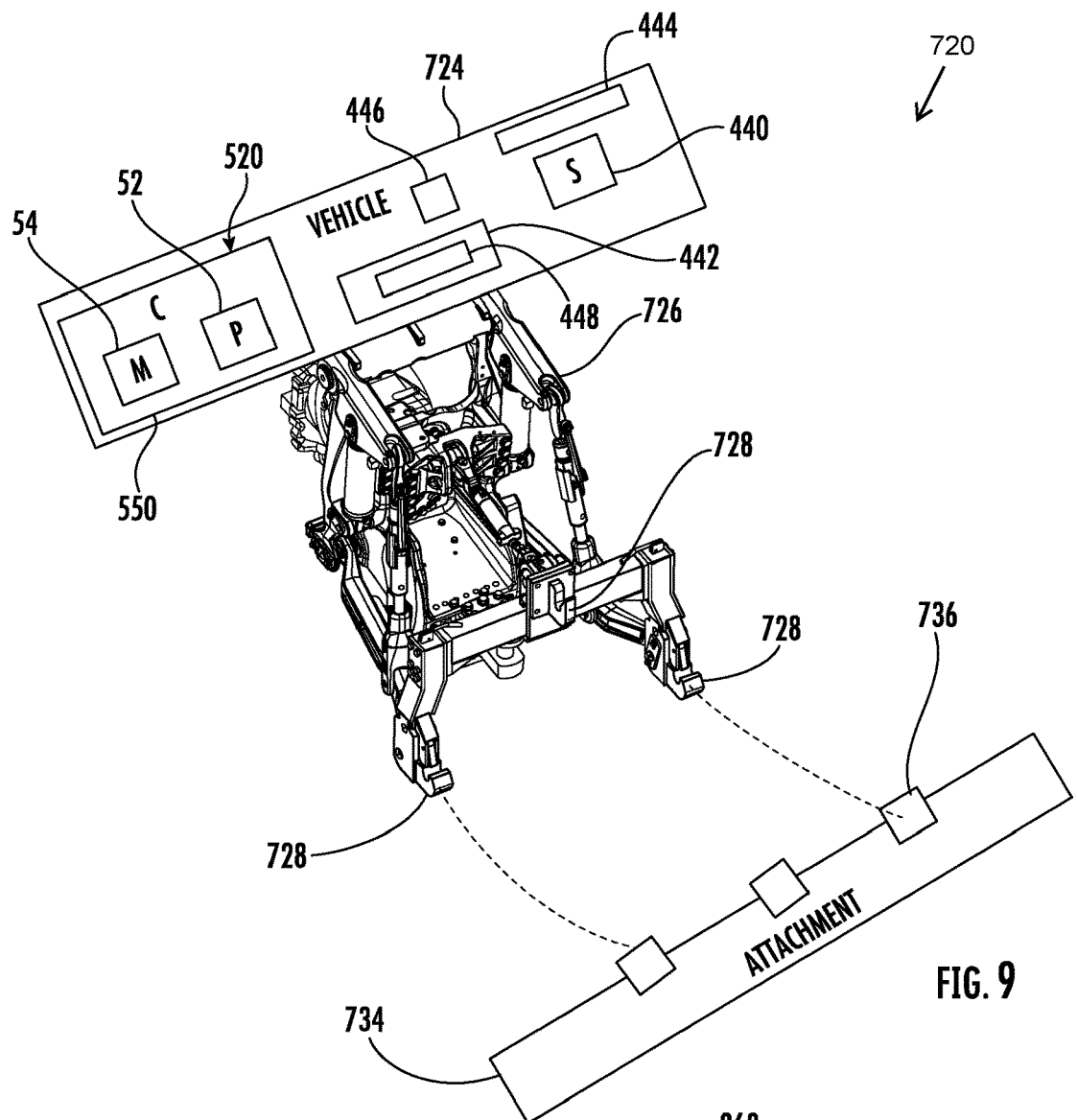
FIG. 9 is a perspective view schematically altering portions of an example vehicle connection guidance system for connecting an example 3 point hitch with an example attachment.

FIG. 9 is a perspective view illustrating portions of an example vehicle 724, such as a tractor, having an example interface in the form of a three-point hitch 726 which is to be connected to a three-point hitch connection interface 736 of an attachment 734 (schematically illustrated). Three-point hitch 726 may extend along the front of vehicle 724 or along the rear of vehicle 724. Three-point hitch 726 provides three spaced connection points 728, triangularly spaced from one another. FIG. 9 further illustrates vehicle 724 equipped with a vehicle connection guidance system 720.

Vehicle connection guidance system 720 is similar to vehicle connection guidance system 520 described above except that the components of system 520 are carried by vehicle 724 rather than harvester 324. In implementations where vehicle 724 comprises a tractor, windshield projector 446 projects the visual representation onto front or rear windshield of the tractor. As described above, system 520 may be operable in various different modes, wherein the visual representation may be depicted on the windshield of the vehicle 724, may be presented on monitor 444 or may be directly projected onto the surrounding terrain by projector 448.

Figure 10:
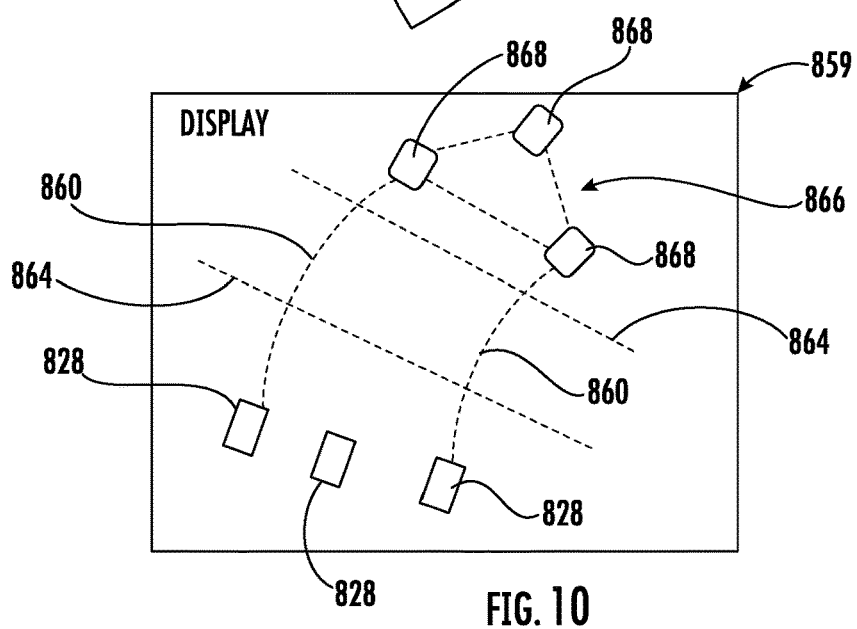
FIG. 10 is a diagram illustrating an example visual presentation presented by the example vehicle guidance system FIG. 9.

FIG. 10 illustrates an example visual representation 859 which may be generated by controller 550. In the example illustrated, visual representation 859 is presented on monitor 444. In other implementations, the visual represented 859 may be depicted on the windshield and/or directly on the terrain underlying the path of travel of three-point hitch 726 as it is being moved towards attachment 734.

In the example illustrated, visual representation 859 includes a graphic representation 828 of the three hitch points 728 of three-point hitch 726. Visual representation 859 further comprises a projected path 860 of the outermost connection points 828 of the three-point hitch 726 and interface connection lines 864 which are to intersect the projected or estimated location of connection points 828 as they are moved along path 860. Interface connection lines 864 have a length greater than the distance separating the outermost connection points 828 (similar to connection lines 564 described above). In addition, visual representation 859 further includes a front view or connection face 866 of the connection interface 726 with graphically represented connection points 868 corresponding to connection points 828. Each of the visual connection assists 828, 860, 864 and 866 assist the operator and steering vehicle 724 to achieve and aligned and parallel relationship between the connection points 728 of three-point hitch 726 and the corresponding three triangularly located connection points 736 of attachment 734.

Although the present disclosure has been described with reference to example implementations, workers skilled in the art will recognize that changes may be made in form and detail without departing from disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle connection guidance system comprising:
    a sensor for being supported by a vehicle having a first width and a connection interface, the connection interface having a second width different than the first width and along which multiple connection points lie, wherein the sensor is configured to output steering angle signals; and
    a controller configured to output presentation signals based upon the steering angle signals,
    wherein the presentation signals are configured to generate a visual presentation of a projected path of the connection interface to an operator of the vehicle, the projected path having a width equal to the second width.

2. The vehicle connection guidance system of claim 1 further comprising:
    a camera configured to be supported by the vehicle; and
    a display configured to present a real-world image captured by the camera,
    wherein presentation signals are configured to cause the projected path of the width of the connection interface to be overlaid on the real-world image presented by the display.

3. The vehicle connection guidance system of claim 2 further comprising the vehicle, wherein the connection interface extends along a front end of the vehicle.

4. The vehicle connection guidance system of claim 3, wherein the vehicle comprises a harvester and wherein the connection interface extends along a front end of a feeder house of the harvester.

5. The vehicle connection guidance system of claim 2 further comprising the vehicle,
    wherein the connection interface extends along a rear end of the vehicle.

6. The vehicle connection guidance system of claim 1, wherein the presentation signals are configured to further generate a connection line corresponding to an edge of the connection interface and having a third width greater than the second width.

7. The vehicle connection guidance system of claim 6, further comprising an attachment configured to be connected to the connection interface;
    wherein the attachment has an attachment connection interface having a fourth width; and
    wherein the presentation signals are configured to further generate a second connection line corresponding to an edge of the attachment connection interface and having a fifth width greater than the fourth width.

8. The vehicle connection guidance system of claim 1, wherein the presentation signals are configured to further generate a highlight line corresponding to boundaries of a connection interface of an attachment configured to be connected to the connection interface.

9. The vehicle connection guidance system of claim 8 further comprising a camera configured to be supported by the vehicle,
    wherein presentation signals are configured to cause the highlight line to be overlaid on a real-world view of the attachment connection interface.

10. The vehicle connection guidance system of claim 1 further comprising a projector,
    wherein the presentation signals cause a projector to project the visual presentation of the projected path of the width of the connection interface onto a terrain upon which the vehicle is configured to traverse.

11. The vehicle connection guidance system of claim 1 further comprising the vehicle, the vehicle comprising a transparent window panel through which the operator may view the connection interface,
    wherein the presentation signals cause the projected path of the width of the connection interface to be overlaid on the transparent window panel.

12. The vehicle connection guidance system of claim 1, wherein the width of the vehicle across which the multiple connection points lie is at least 0.5 m.

13. The vehicle connection guidance system of claim 1, wherein the presentation signals are configured to further generate a target position for the connection interface.

14. The vehicle connection guidance system of claim 1, wherein the projected path extends in a first plane and wherein the presentation signals are configured to further generate a face of the connection interface in a second plane orthogonal to the first plane.

15. The vehicle connection guidance system of claim 1, further comprising an attachment configured to be connected to the connection interface;
    wherein the presentation signals are to further generate a connection line corresponding to an edge of the connection interface that is facing the attachment during approach of the connection interface towards the attachment.

16. A vehicle connection guidance method comprising:
    receiving steering angle signals from a sensor indicating a current steering angle of a vehicle having a first width and a connection interface, the connection interface having a second width along which multiple connection points for connecting to an attachment are located;
    displaying a projected path of the vehicle connection interface as the vehicle moves towards the attachment, the projected path having a width equal to the second width; and determining the projected path of the connection interface based upon the steering angle signals.

17. The method of claim 16 further comprising:
generating a connection line corresponding to an edge of the connection interface and having a third width greater than the second width.

18. The method of claim 17 further comprising:
capturing a real-world image of an approach of the vehicle towards the attachment with a camera;
presenting the real-world image of the approach on the display; and
displaying the projected path of the connection interface and the connection line concurrently overlaid on the real-world image of the approach on the display.

19. A vehicle connection guidance system comprising:
a vehicle having a first width and a connection interface, the connection interface having a second width different than the first width and along which multiple connection points lie;
a sensor configured to output steering angle signals; and
a controller configured to output presentation signals based upon the steering angle signals;
wherein the presentation signals are configured to generate a visual presentation of a projected path of the connection interface to an operator of the vehicle, the projected path having a width equal to the second width.

20. The method of claim 16, wherein the vehicle comprises a harvester and wherein the connection interface extends along a feeder house of the harvester.

* * * * *